(12) United States Patent
Scholte (10) Patent No.: US 7,765,767 B2
(45) Date of Patent: Aug. 3, 2010

(54) MULTIFUNCTIONAL CONSTRUCTIONAL MODULAR ELEMENT FOR MACHINE-BUILDING OF A MACHINE FRAME CONSTRUCTION FOR A PACKAGING MACHINE

(75) Inventor: Gerardus Petrus Scholte, Ter Apel (NL)

(73) Assignee: G.P.R. Scholte Holding B.V., Emmen (NL)

( * ) Notice: Subject to any disclaimer, the term of this patent is extended or adjusted under 35 U.S.C. 154(b) by 719 days.

(21) Appl. No.: 10/550,470

(22) PCT Filed: Mar. 24, 2004

(86) PCT No.: PCT/NL2004/000199

§ 371 (c)(1),
(2), (4) Date: Mar. 19, 2007

(87) PCT Pub. No.: WO2004/085112

PCT Pub. Date: Oct. 7, 2004

(65) Prior Publication Data

US 2007/0163208 A1    Jul. 19, 2007

(30) Foreign Application Priority Data

Mar. 25, 2003 (NL) .................................... 1023010

(51) Int. Cl.
*E04D 15/00* (2006.01)
*E04F 21/00* (2006.01)
*E04G 21/14* (2006.01)

(52) U.S. Cl. .......................... 52/749.1; 52/831; 52/704; 52/656.1; 53/568; 493/214

(58) Field of Classification Search ................... 53/512, 53/568, 581, 582; 493/214; 52/656.1, 656.2, 52/656.6, 657, 633, 800.16, 800.18, 831, 52/704, 749.1

See application file for complete search history.

(56) References Cited

U.S. PATENT DOCUMENTS

| 1,867,226 | A | | 7/1932 | Martin |
| 3,983,682 | A | * | 10/1976 | Scully .......................... 53/525 |
| 5,175,014 | A | * | 12/1992 | Brockwell et al. .......... 426/582 |
| 5,426,919 | A | | 6/1995 | Natterer et al. |
| 6,029,428 | A | * | 2/2000 | Terminella et al. ............. 53/551 |

FOREIGN PATENT DOCUMENTS

| DE | 31 31 955 A | 3/1983 |
| DE | 92 16 764 U | 3/1993 |
| FR | 1 386 323 A | 1/1965 |

* cited by examiner

*Primary Examiner*—Richard E Chilcot, Jr.
*Assistant Examiner*—Chi Q Nguyen
(74) *Attorney, Agent, or Firm*—Knobbe Martens Olson & Bear LLP (57) ABSTRACT

The invention relates to a machine frame (1) for a packaging machine being constructed in such a way that its manufacture is simple and flexible for the various widths and lengths of foil packaging material without having the need for an expensive and labor intensive intercoupling. This machine frame is also robust and interiorly good cleanable, so that hygienic risks may be substantially decreased. This machine-building element comprises a profile element (2) made of strong sheet material, like e.g. metal or plastic material, comprising a mainly straight horizontal part (2c) that tapers off on both sides over an angle of approximately 90° to two downwardly directed vertical parts (2a, 2b). These parts are longitudinally interconnected completely to a compact unit by means of a plurality of hollow functional sockets (7).

8 Claims, 11 Drawing Sheets

MULTIFUNCTIONAL CONSTRUCTIONAL MODULAR ELEMENT FOR MACHINE-BUILDING OF A MACHINE FRAME CONSTRUCTION FOR A PACKAGING MACHINE

BACKGROUND OF THE INVENTION

1. Field of the Invention

This invention relates to a multifunctional modular constructed machine building element with greatly improved mounting and application flexibility and highly decreased hygienic risks and it relates to a packaging machine frame constructed therefrom.

2. Description of the Related Art

Frames of modern packaging machines for use in the food industry are principally constructed from profile elements manufactured from aluminum or stainless steel among others because of extremely high hygienic requirements. This results in high material costs making it necessary to line up a machine flexible with respect to its product range. This machine should be easily adjustable to various sizes of the products to be packed, like e.g. from small packages for some grams of meat products to the voluminous packaging of e.g. vegetables without having the need to perform a labor intensive rebuilding thereof by means of e.g. intercoupling for each new product type (having different sizes than before). The necessity to construct this machine solid, robust and free of vibration creates another different very important requirement because of the required high production capacity and speed, whereby for a piece of food to be packed usually a very limited life duration outside the cooling will be available. The high hygienic requirement is further demonstrated in the fact that such type of packaging machine should be frequently, e.g. at least once a day, easily and thoroughly be cleaned, whereby every chance for survival and/or development of undesirable bacteria must be excluded.

Existing packaging machines fail to comply with all these requirements. On the one hand an existing machine construction offers little flexibility, due to which expensive adjustments are needed to change a product assortment. On the other hand reaching of a required high hygienic level is getting almost impossible due to an angular arrangement of the constructional elements/components as a result of which cleaning devices and means are very time-consuming and consequently expensive.

SUMMARY OF THE INVENTION

The objective of this invention is to construct a machine frame for a packaging machine which is constructed in such a way, that the construction for various dimensions, widths as well as lengths of foil packaging material, is simple and flexible without the need for an expensive and labor-intensive intercoupling. The constructional components, more particularly the supporting profile elements in the proximity of the packaging process, need to be as accessible as possible, so that undesirable accumulation of dirt and moisture is minimized to restrict hygienic risks. At the same time cleaning with appropriate cleaning means will also be radical but also be simply performable because in most cases a cleaning process has to be performed at least once a day.

By the application of the new multifunctional modular machine-building element according to the invention in the construction of a machine frame for a packaging machine said problems will be removed, but also the aforesaid requirements are met.

A multifunctional constructional modular element for machine-building purposes according to the invention comprising:

1. a profile element made of solid strong sheet material, like e.g. metal or plastic material, which profile element consists of an infinite profile comprising:
   1.1. a mainly straight directed horizontal part that tapers off on both sides over an angle of approximately 90° to
   1.2. a first downwardly directed vertical part and
   1.3. a second downwardly directed vertical part which is in a position parallel or not to the first vertical part;

at least one of the vertical profile parts 1.2, 1.3 longitudinally being provided at mutually regular distances with cut-away portions for the insertion of 2. at least a hollow functional socket for interconnection of the vertical profile parts 1.2, 1.3 to a compact unit, which functional socket is interfixed by the application of an appropriate method known per se, like e.g. welding, this functional socket also being provided with internal threading to receive an appropriate coupling element or module for use in a machine building construction, like e.g. an adapter socket, provided with a mating external threading;

one and another in such a way that girders and vertical stands for the construction of a machine, like e.g. a packaging machine for the food industry, may be entirely constructed from one or more of such profile elements 1 with one or more functional sockets 2, resulting in a machine construction characterized in that it is very flexible, robust and allowing the profiles being interiorly good cleanable, thereby decreasing hygienic-risks.

Possibly more functional sockets may be used to mount other machine parts on the (system) profile elements so that the forces and moments can be lead evenly into the machine frame. One may think e.g. of a so-called adapter shaft but also of a chain guide profile, etcetera.

By varying the length of the adapter shaft a packaging machine having one (fixed) frame width may be adopted for various widths of the packaging material to be processed.

BRIEF DESCRIPTION OF THE DRAWINGS

The invention will be described hereinafter on the basis of the drawings.

DETAILED DESCRIPTION

Figure 1:
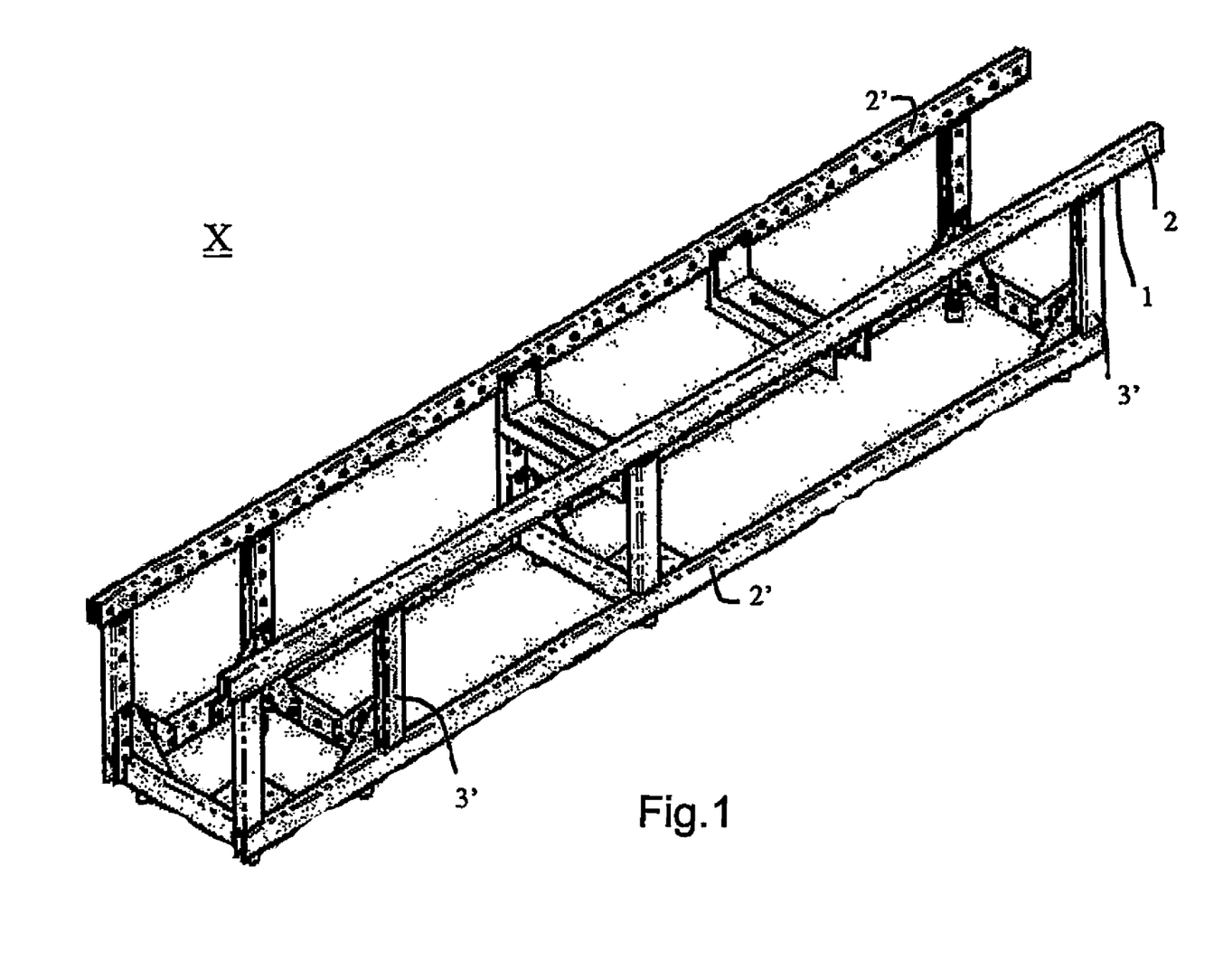
FIG. 1a is a perspective view of a packaging machine frame according to the invention.
FIG. 1b is a side view of a similar packaging machine frame according to the invention.

According to the invention in FIG. 1 *a* the new machine frame of packaging machine X is constructed of a frame 1 comprising horizontal girders 2' and vertical stands 3' made of a similar elongated profile 2.

Figure 1B:
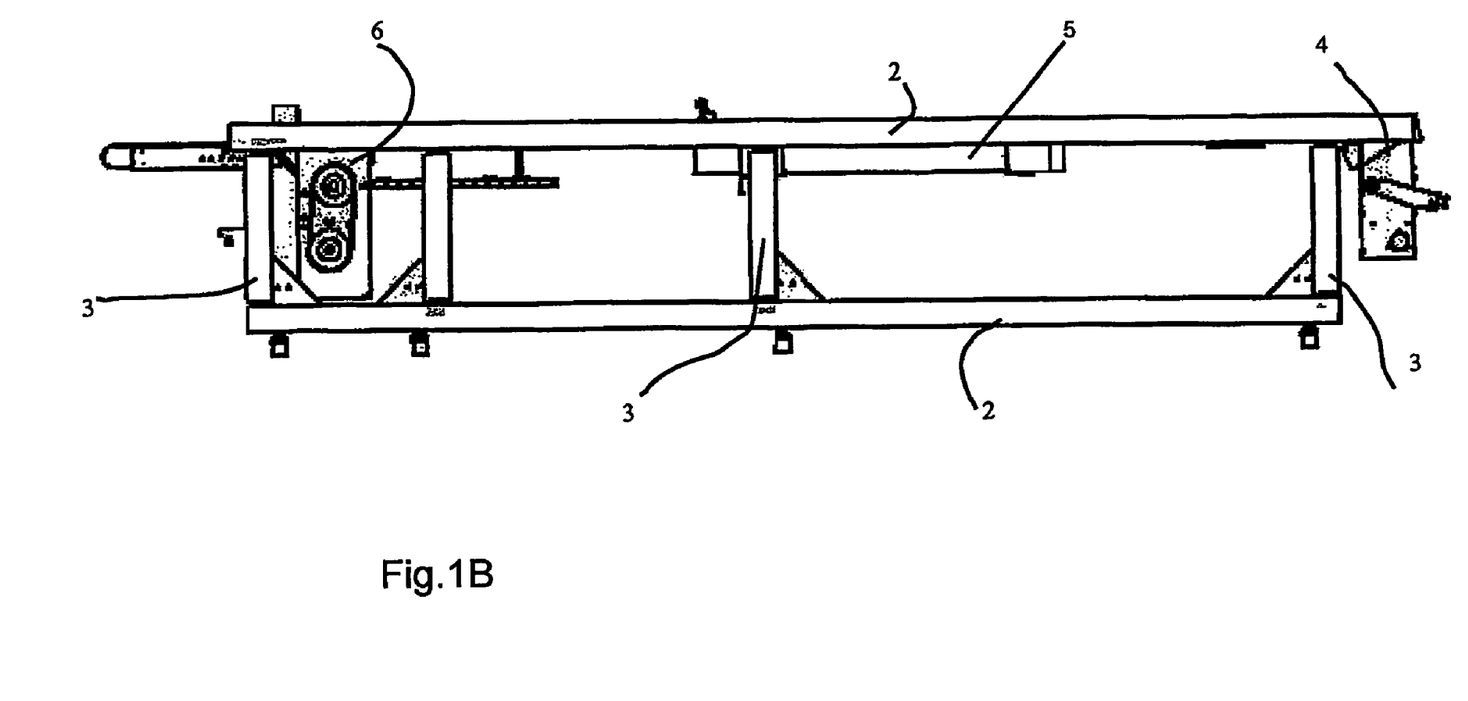

As shown in FIG. 1 b the frame 1 carries various workstations and modules, such as a vacuum module 4, a press module 5 and a chain driven transport device 6, all mounted on the upper positioned girders 2'.

Figure 2A:
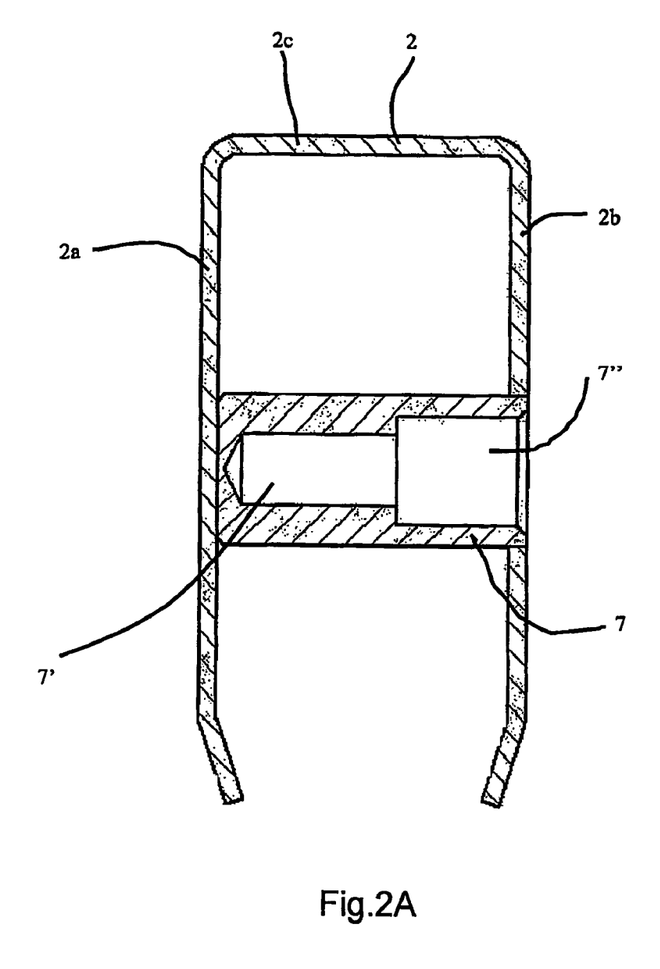
FIG. 2a is a cross-section of a multifunctional constructional modular machine-building element according to the invention.

In FIG. 2a the multifunctional modular machine-building element comprises an elongated (system) profile element 2. The profile element 2 is in cross-section U-shaped with a principally straight horizontal middle part 2c with downwardly directed vertical upright legs 2a, 2b. In a preferential embodiment this profile element 2 is made of strong steel sheet. To reinforce this profile element 2 hollow cylindrically shaped functional sockets 7 are provided at mutually regular distance along its length to provide for a robust compact unit interconnecting the upright profile parts 2a, 2b. Said functional sockets are each fixed there in-between by means of an appropriate method like e.g. welding and are further also provided with internal threading 7'. Functional socket 7 is also provided with a positioning hole 7" in which a fitting bolt (not shown) or adapter shaft (not shown) may be mounted. In this way the system profile may absorb great forces and moments.

Possibly more functional sockets may be used for mounting other machine parts so that the forces and moments are evenly introduced into the profile.

Figure 2B:
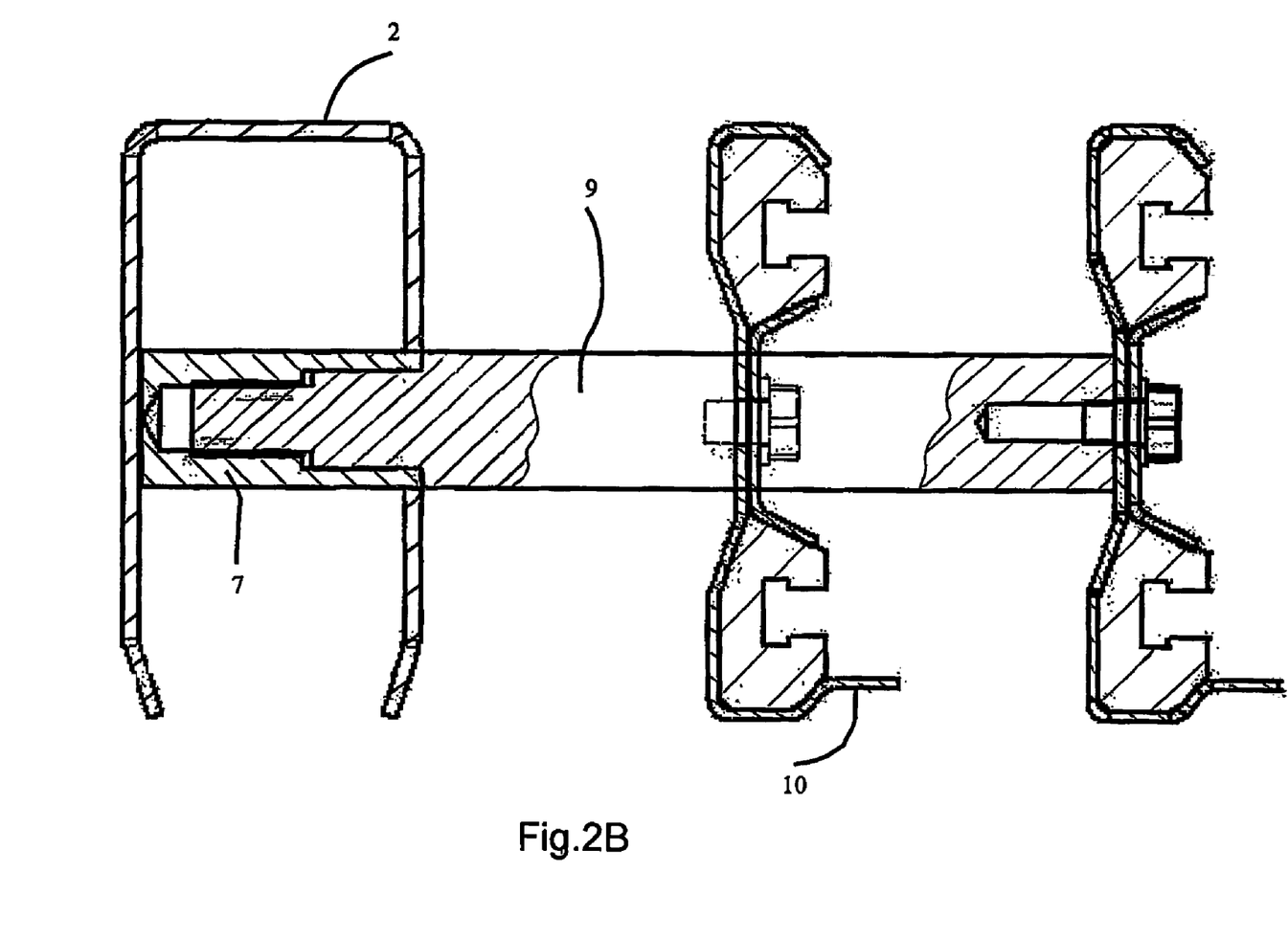
FIG. 2b is a cross-section of a similar multifunctional constructional modular machine-building element provided with a chain guide profile attached thereto.

According to an embodiment of FIG. 2b the adapter shaft 9 has been mounted in the functional socket 7 and a chain guide profile 10 being attached thereto. By varying the length of the adapter shaft 9 the packaging machine having one frame width may be made appropriate for various widths of the packaging material to be processed (not shown).

Figure 3:
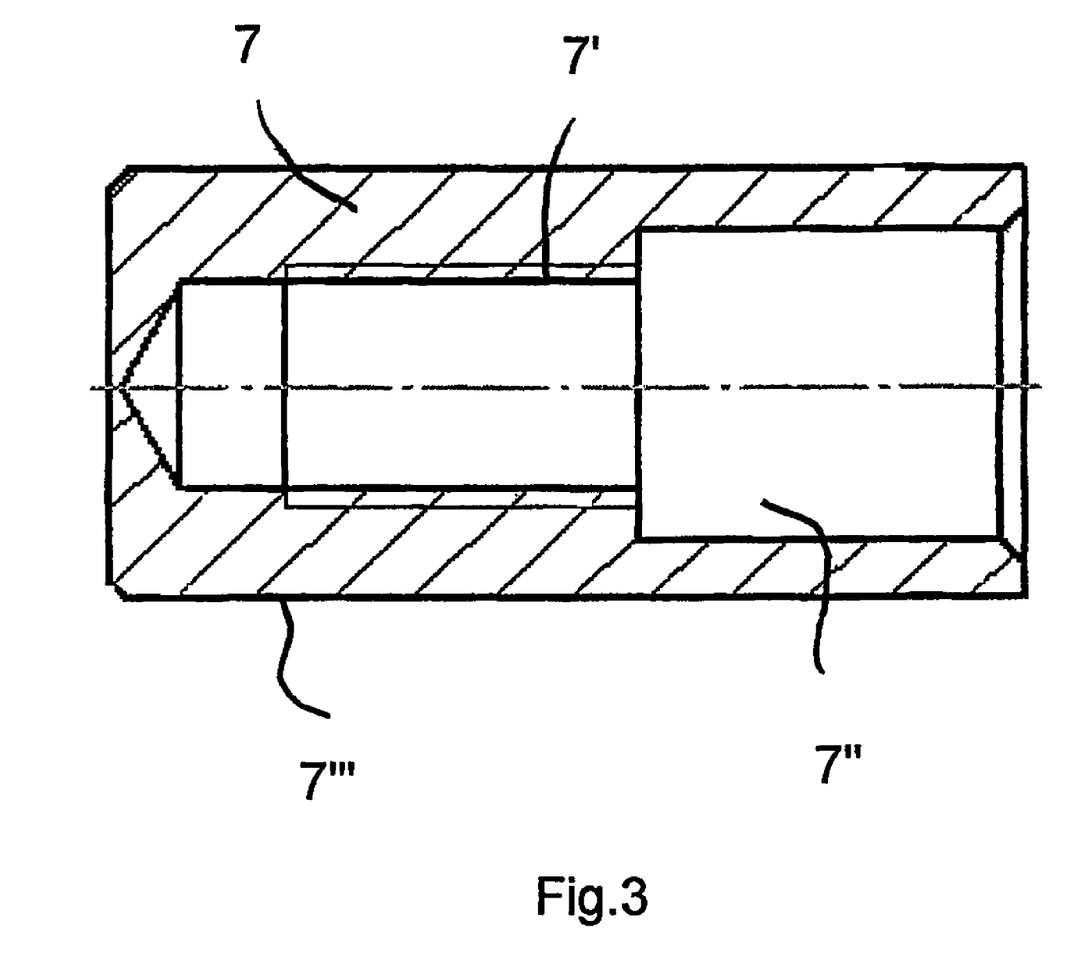
FIG. 3 is a cross-section of a functional socket according to the invention.

A preferential embodiment of functional socket 7 is shown in FIG. 3. The external surface 7''' of the functional socket 7 is preferably cylindrically shaped allowing frequent cleaning by means of appropriate cleaning means to be practiced thoroughly and simply. Furthermore function socket 7 is provided with a positioning hole 7" for insertion of e.g. a fitting bolt (not shown) or an adapter shaft (not shown).

Figure 4:
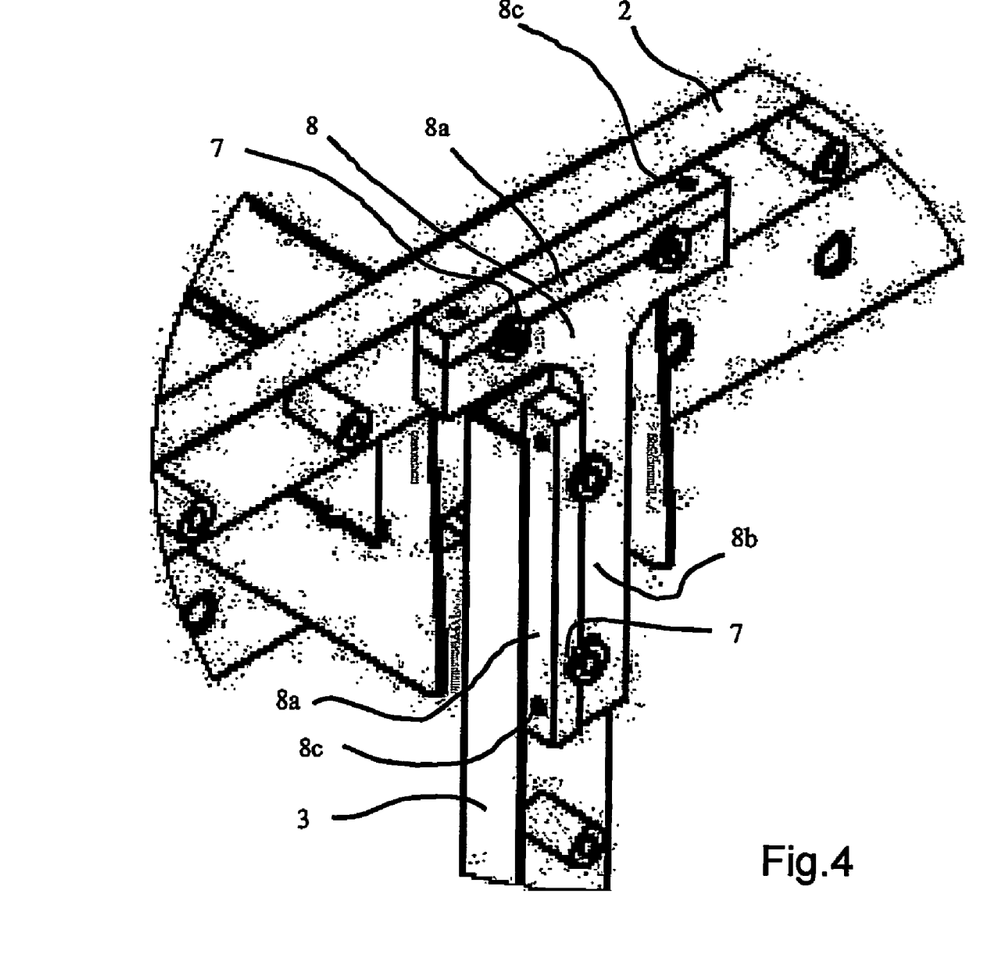
FIG. 4 is a perspective view detail of a packaging machine frame according to the invention.

According to FIG. 4 a girder 2 is interconnected with a stand 3 in a compact unit by means of a clamping piece 8 mounted over a number of functional sockets 7. This clamping piece 8 comprises a T-shaped element 8b and a straight element 8a, both elements 8a and 8b being provided with cylindrically shaped cut-aways that match the cylindrically shaped external surface 7''' of a functional socket 7. A T-shaped element 8b and a straight element 8a respectively are interconnected by means of a screw connection 8c with two functional sockets 7 of the girder 2 and two functional sockets 7 of the stand 3.

Figure 5A:
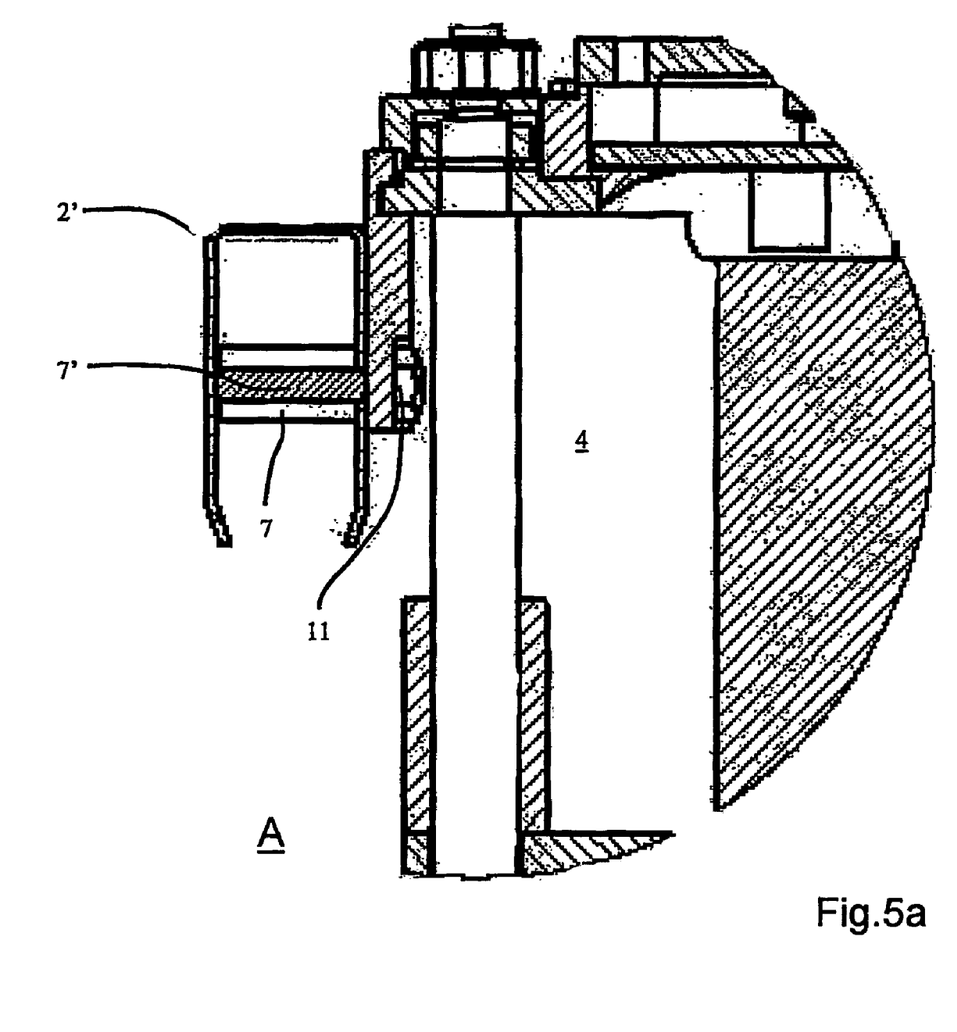
FIG. 5a is a cross-sectional detail of a packaging machine frame according to the invention in an embodiment.

FIG. 5a shows schematically in cross-section the way of attachment A of a workstation 4 to the girder 2'. Here use has been made of a functional socket 7, under application of a fitting bolt 11.

Figure 5B:
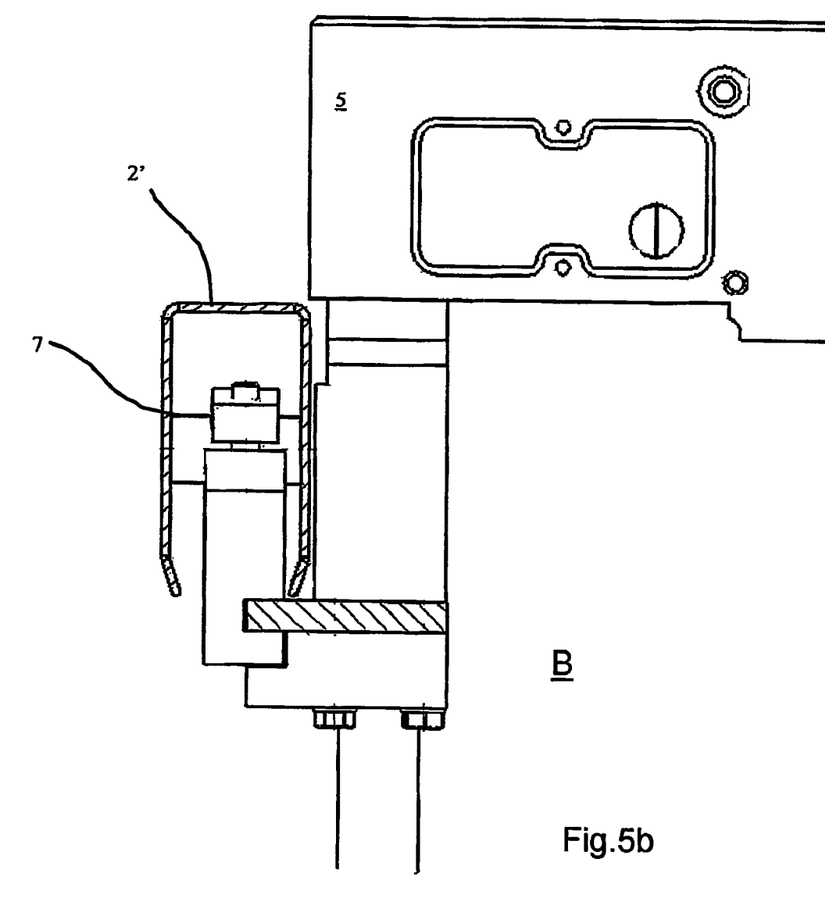
FIG. 5b is a cross-sectional detail of a packaging machine frame according to the invention in another embodiment.
Figure 5C:
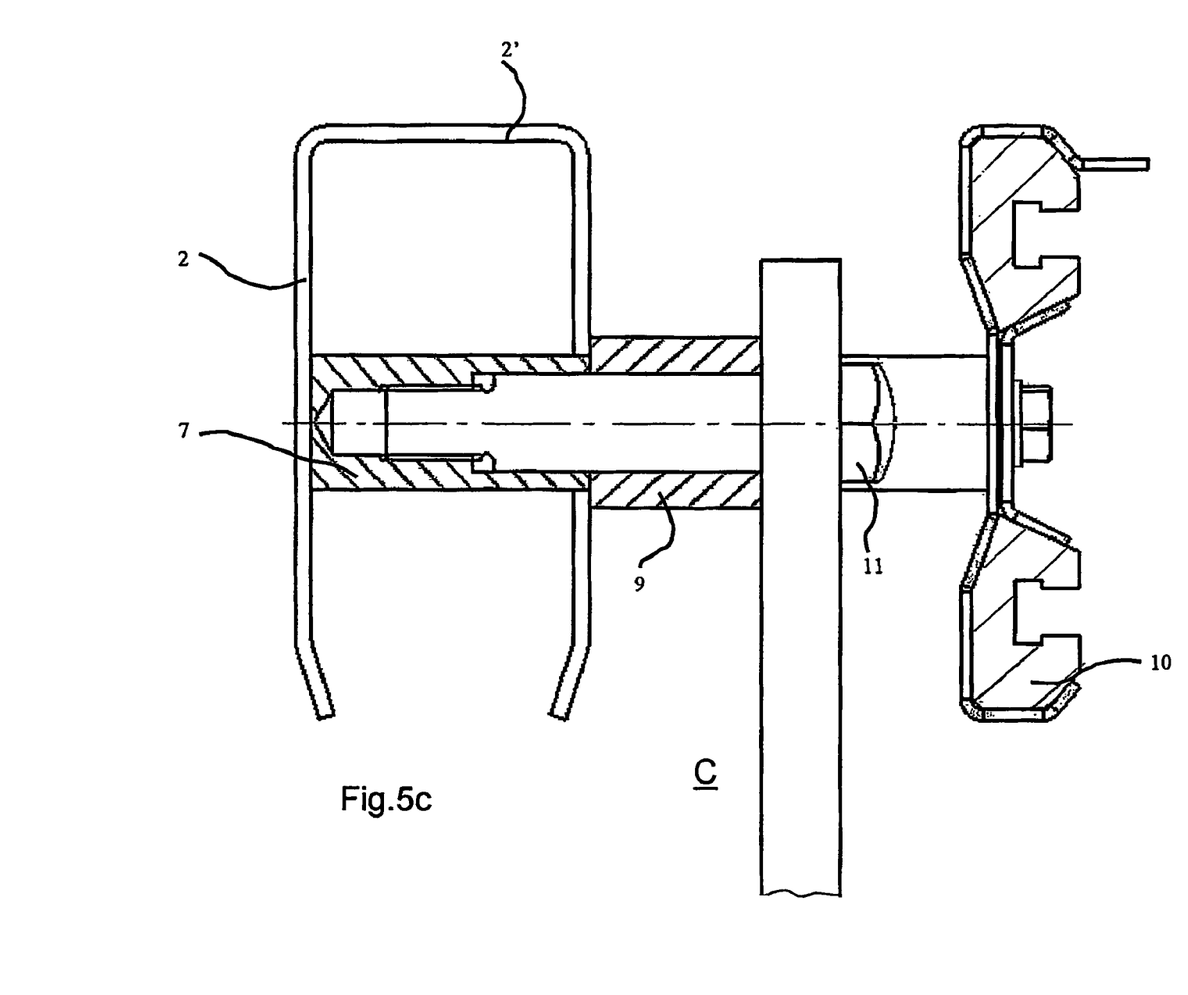
FIG. 5c is a cross-sectional detail of a packaging machine frame according to the invention in another embodiment.

FIG. 5b shows schematically in cross-section the way of attachment B of another workstation 5 to the girder 2', while FIG. 5c shows a way of attachment C for the connection of a chain guide profile 10 with girder 2. By use of a multifunctional constructional modular element 2 for machine-building adapter shafts 9 of various lengths, such adapter shafts 9 being provided or not with a fitting bolt 11, may be fitted in a system creating innumerable attachment possibilities for obtaining a construction having a maximum strength and a minimum of hygienic risk.

Figure 6:
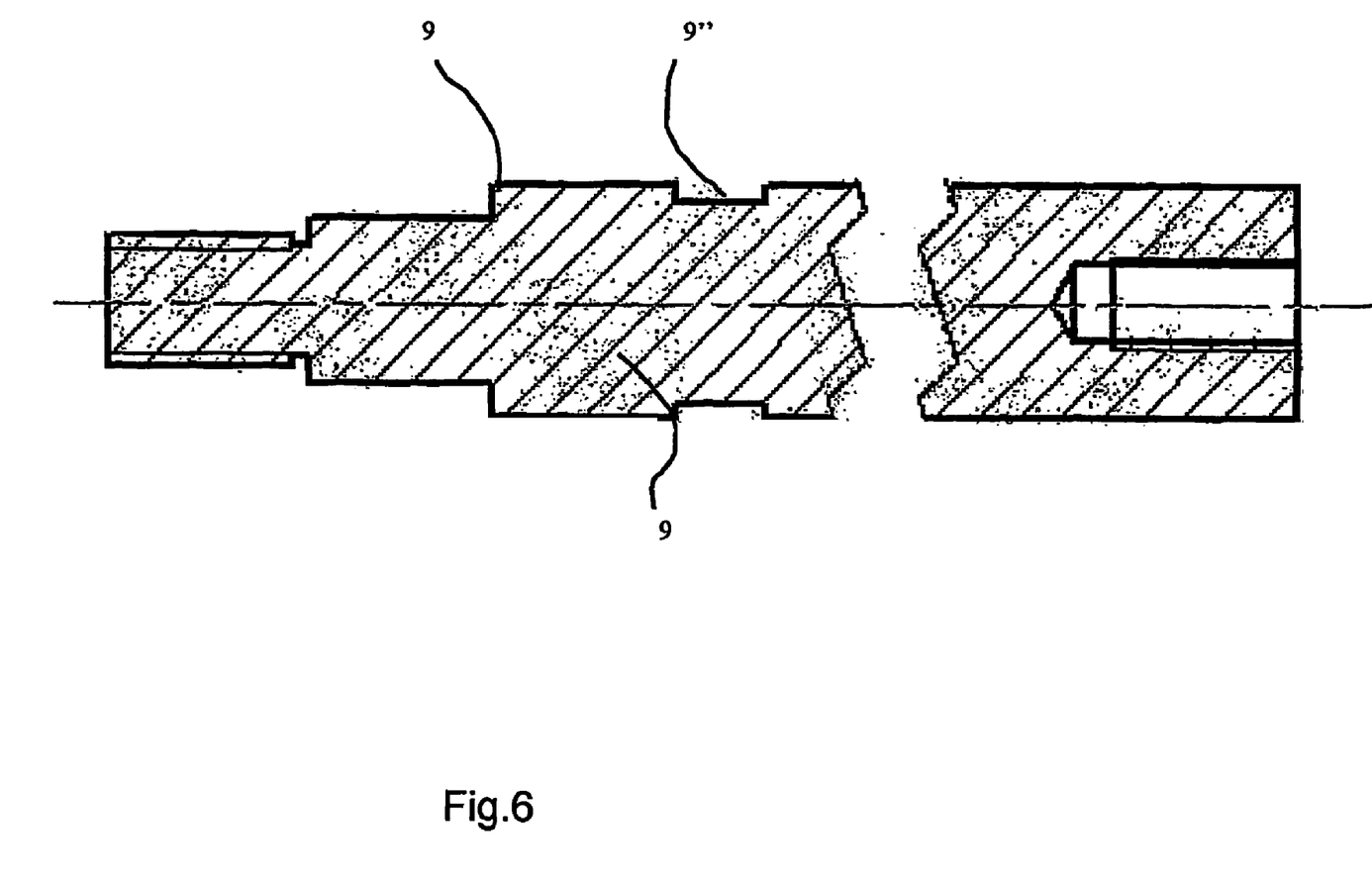
FIG. 6 is a cross-section of an adapter shaft.

FIG. 6 shows an adapter shaft 9 in a preferred embodiment with a cylindrically shaped surface 9' and a partially flat side 9" for mounting aforesaid workstations (not shown).

Figure 7:
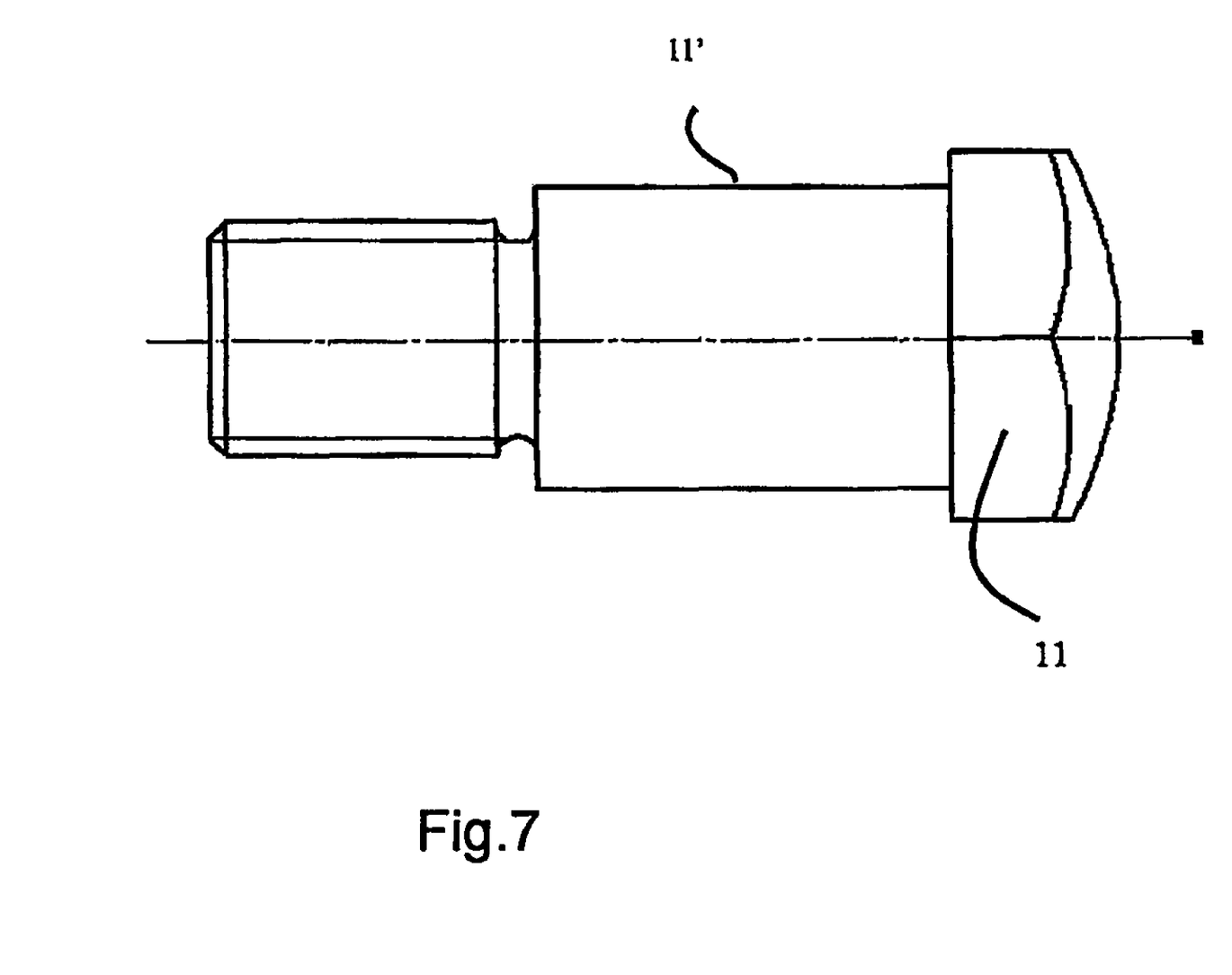
FIG. 7 is a front view of a fitting bolt.

FIG. 7 shows a preferred embodiment of a fitting bolt 11 provided with a fitting plane 11' making a precise attachment to the system profile (not shown) possible.

The adapter shaft 9 and fitting bolt 11 are, likewise to the multifunctional constructional modular machine-building element (not shown), smooth on the outside and made of stainless steel to obtain a construction having a minimum hygienic risks.

In the above the invention has been clarified on the basis of a small number of preferred embodiments. However it may be clear that a lot of variations with respect to its performance and design of e.g. a profile element, a functional socket or an attachment system are possible without leaving the context of the invention, as described in the claims.

The invention claimed is:

1. A multifunctional constructional modular element for machine-building purposes comprising:
   a profile element made of solid strong sheet material wherein the profile element comprises:
      a mainly straight horizontal part that tapers off on both sides at an angle of approximately 90° to a first downwardly directed vertical part and a second downwardly directed vertical part;
   wherein at least one of the vertical parts of the profile element is longitudinally provided at mutually regular distances with cut-away portions for the insertion of one or more functional sockets for interconnection of the vertical profile parts to a compact unit;
   wherein the functional socket is provided with internal threading to receive a coupling element or module for use in a machine building construction; and
   wherein girders and vertical stands for the construction of a machine are coupled to one or more of such profile elements with one or more functional sockets for machine construction.

2. The multifunctional constructional modular element for machine-building purposes according to claim 1, wherein both the profile element as well as the hollow functional socket are made of stainless steel.

3. The multifunctional constructional modular element for machine-building purposes according to claim 1, wherein the cross-section of the profile element is C- or U-shaped and has a wall thickness of approximately 2 mm.

4. The multifunctional constructional modular element for machine-building purposes according to claim 1, wherein the hollow functional socket is of cylindrical shape.

5. A packaging machine comprising at least a machine frame or a vertical stand-up construction which is completely constructed out of one or more multifunctional constructional modular elements for machine-building according to claim 1.

6. The packaging machine according to claim 5, wherein the machine frame is of a uniform width, and wherein the differently chosen coupling elements, modules, and chain guide profiles are mounted on the frame by means of one or more adapter or functional sockets in such a way that every desirable foil width to be used in the packaging process will be applicable.

7. The packaging machine according to claim 6, wherein the coupling elements are provided with a joint face for close fitting into the positioning hole.

8. The multifunctional constructional modular element for machine building purposes according to claim 1, wherein the hollow functional socket is provided with a positioning hole adjacent to the cut-away portion.

* * * * *

UNITED STATES PATENT AND TRADEMARK OFFICE
CERTIFICATE OF CORRECTION

| | | |
|---|---|---|
| PATENT NO. | : 7,765,767 B2 | |
| APPLICATION NO. | : 10/550470 | |
| DATED | : August 3, 2010 | |
| INVENTOR(S) | : Geradus Petrus Scholte | |

It is certified that error appears in the above-identified patent and that said Letters Patent is hereby corrected as shown below:

Title Pg, Item (54) Title and column 1, lines 1-5, please delete "MULTIFUNCTIONAL CONSTRUCTIONAL MODULAR ELEMENT FOR MACHINE-BUILDING OF A MACHINE FRAME CONSTRUCTION FOR A PACKAGING MACHINE" and insert therefore, --MULTIFUNCTIONAL FRAME--.

Signed and Sealed this
Twenty-second Day of February, 2011

David J. Kappos
*Director of the United States Patent and Trademark Office*